(12) United States Patent
Schinkinger et al.

(10) Patent No.: US 9,073,780 B2
(45) Date of Patent: Jul. 7, 2015

(54) RAW MATERIAL FOR PRODUCING BASALT FIBERS

(75) Inventors: Thomas Schinkinger, Alkoven (AT); Anton Mayer, Leoben (AT)

(73) Assignee: ASA.TEC GmbH, Lagenlois (AT)

( * ) Notice: Subject to any disclaimer, the term of this patent is extended or adjusted under 35 U.S.C. 154(b) by 128 days.

(21) Appl. No.: 13/996,115

(22) PCT Filed: Dec. 21, 2011

(86) PCT No.: PCT/AT2011/050051
§ 371 (c)(1),
(2), (4) Date: Aug. 27, 2013

(87) PCT Pub. No.: WO2012/083334
PCT Pub. Date: Jun. 28, 2012

(65) Prior Publication Data
US 2013/0330534 A1     Dec. 12, 2013

(51) Int. Cl.
C03C 13/06 (2006.01)
C03C 1/00 (2006.01)
C03C 1/02 (2006.01)

(52) U.S. Cl.
CPC ............. C03C 13/06 (2013.01); C03C 1/002 (2013.01); C03C 1/026 (2013.01)

(58) Field of Classification Search
CPC ........ C03C 13/06; C03C 1/002; C03C 1/026; C03B 1/00; C03B 37/00; C03B 37/02
USPC ............. 501/27–31, 35, 36; 65/19, 454, 469, 65/482
See application file for complete search history.

(56) References Cited

U.S. PATENT DOCUMENTS

| 4,304,604 A | | 12/1981 | Daerr et al. | |
| 4,328,019 A | * | 5/1982 | Dejaiffe et al. | 65/19 |
| 4,363,878 A | | 12/1982 | Yamamoto et al. | |
| 4,764,487 A | * | 8/1988 | Lewis | 501/70 |
| 5,167,876 A | * | 12/1992 | Lem et al. | 252/602 |
| 5,472,917 A | * | 12/1995 | Talling et al. | 501/28 |
| 5,962,354 A | * | 10/1999 | Fyles et al. | 501/36 |
| 6,698,245 B1 | * | 3/2004 | Christensen et al. | 65/376 |
| 7,267,720 B2 | * | 9/2007 | Sadikovic | 106/789 |

FOREIGN PATENT DOCUMENTS

| AT | 509 990 A4 | 1/2012 |
| CN | 1287198 A | 3/2001 |
| DE | 2 005 675 B1 | 8/1975 |
| DE | 28 48 731 A1 | 5/1980 |
| DE | 223 435 A1 | 6/1985 |
| EP | 0 768 283 A2 | 4/1997 |
| GB | 1 322 914 | 7/1973 |
| GB | 2220654 A * | 1/1990 |
| WO | WO 97/22563 A1 | 6/1997 |
| WO | WO 00/73233 A1 | 12/2000 |

OTHER PUBLICATIONS

International Search Report of PCT/AT2011/050051, date of mailing Jul. 9, 2012.
International Preliminary Report on Patentability of PCT/AT2011/050051, Jun. 25, 2013.

* cited by examiner

*Primary Examiner* — Anthony J Green
*Assistant Examiner* — Elizabeth A Bolden
(74) *Attorney, Agent, or Firm* — Collard & Roe, P.C.

(57) ABSTRACT

The invention relates to a raw material charge for a melt for producing continuous mineral fibers, containing 30% to 70% basalt and/or diabase, 8% to 40% quartz components, in particular quartz sand, and 5% to 30% slag, in particular blast furnace slag, the use thereof and a method of producing continuous mineral fibers from a melt, the melt being formed from raw material comprising 30% to 70% basalt and/or diabase, 8% to 40% quartz components, in particular quartz sand, and 5% to 30% slag, in particular blast furnace slag.

14 Claims, No Drawings

RAW MATERIAL FOR PRODUCING BASALT FIBERS

CROSS REFERENCE TO RELATED APPLICATIONS

This application is the National Stage of PCT/AT2011/050051 filed on Dec. 21, 2011 which claims priority under 35 U.S.C. §119 of Austrian Application No. A 2117/2010 filed on Dec. 22, 2010, the disclosure of which is incorporated by reference. The international application under PCT article 21(2) was not published in English.

The invention relates to a raw material charge for a melt for producing continuous mineral fibers and a method of producing continuous mineral fibers from a melt and the use of the raw material charge proposed by the invention.

Mineral fibers are fibers of inorganic raw materials. Mineral fibers also include basalt fibers, which are industrially produced thin rock fibers, in particular fibers of basalt.

Generally speaking, although mineral fibers have an appearance that is similar to that of glass fibers, their chemical composition is significantly different from that of glass fibers due to the high content of iron and calcium and magnesium and a relatively low proportion of silicon dioxide and aluminum.

However, a clear distinction must be made between basalt wool and continuous basalt fibers. Continuous basalt fibers are not harmful to the health. Based on current scientific knowledge, it is assumed that only fibers with a length >5 µm, a diameter <3 µm and a length/thickness ratio >3 (WHO fibers) may potentially cause lung tumors in humans on inhalation. In the case of thicker fibers (diameter >3 µm), such a risk is not expected because these thicker fibers cannot be separated if inhaled through the nose and are therefore not able to reach the lungs.

Mineral fibers lend themselves to many and varied industrial applications. The physical properties and hence the fields of application are similar to those of glass fibers. Basalt fibers are used as reinforcing fibers in fiber-plastic composites, such as used in lightweight materials for motor vehicles and utility vehicles, space travel, the aircraft and equipment industry, etc., or as a heat-protective material. They are suitable for use in numerous high temperature applications. With new technologies, it is even possible to process the finest fibers with a thickness of less than 0.01 mm and produce a woven fabric.

Basalt fiber, or to be more accurate continuous basalt fiber (CBF), is produced by a melting process. Basalt rock with defined chemical properties is refined during a complex melting process to produce basalt fibers. They are made from a liquid basalt melt at approximately 1400° C. The composition of the melt influences the physical and chemical properties and characteristics of the basalt fibers.

The use of rocks such as basalt, dolomite, limestone or slag as a means of producing mineral fibers is generally known. However, basalts are not well suited for melts in cupola furnaces or electric furnaces. They soften at a relatively low melting temperature but become very viscous across a large temperature range as the temperature rises. This means that a continuous melting process and a uniform outflow of the melt from the melting unit cannot be guaranteed. Although adding basic additives such as limestone or dolomite or foamed blast furnace slag to the basalt results in a uniform melt flow, it simultaneously results in a short softening time. During the subsequent process of producing fibers, this also has a detrimental effect on the fiber quality and also on the fiber yield.

DD 223 435 A1 discloses melt comprising 75% to 45% basalt and 25% to 55% diabase for producing mineral fibers from molten rock. Up to 10% of blast furnace slag or limestone can be added to the melt. There is no need for any pre-processing in order to homogenize or break down the elements prior to their use in the melting unit.

The objective of this invention is to propose a raw material charge for a melt for producing continuous mineral fibers whilst improving the properties of the melt conducive to the production of continuous mineral fibers of a high fiber quality, in particular continuous basalt fibers.

The objective of the invention is achieved, independently in each case, by means of a raw material charge comprising 30% to 70% basalt and/or diabase, 10% to 40% quartz components, in particular quartz sand, and 5% to 30% slag, in particular blast furnace slag, as well as a method of producing continuous mineral fibers from a melt formed from raw material comprising 30% to 70% basalt and/or diabase, 8% to 40% quartz components, in particular quartz sand, and 5% to 30% slag, in particular blast furnace slag, and the use thereof for producing a mineral fiber as a non-metallic protection or armoring.

The fact of using basalt or diabase as the main component of the raw material charge advantageously results in a material which may be regarded as inexhaustible as a raw material due its extremely widespread occurrence and constant creation due to volcanic activity.

The same applies to the use of quartz sand, the worldwide quartz sand reserves being regarded as practically unlimited. Using quartz sand enables the desired proportion of silicon dioxide to be obtained in the continuous basalt fiber, needed as a network former.

Slag is the term used in metallurgy to describe a vitreous or crystalline, solidified melt residue of a non-metallic nature. It essentially consists of lime silicates and siliceous glass. The proportion of glass is usually >75%. Slag, in particular blast furnace slag, is advantageously used as a means of obtaining the silicon dioxide proportion and hence the proportion needed in the melt or in the mineral fiber as a network former. Adding the raw materials proposed by the invention when producing mineral fibers enables production costs to be kept low compared with adding the requisite materials in pure form.

By using the described raw materials such as basalt or diabase, quartz sand and blast furnace slag, the quantity of other additives that would increase the cost of producing mineral fibers, in particular continuous basalt fibers, and would also be harmful to the environment, can be avoided or reduced as far as possible.

Basalt fibers made from the raw materials proposed by the invention contain no toxic and/or hazardous components. The continuous filaments proposed by the invention are oriented fibers with a mean fiber diameter >9 µm and, given the low variance of approximately 10% from the standard, contain no fibers with a diameter <3 µm. Furthermore, they do not split lengthways (fibrillate), which means that there is no occurrence of fiber fragments which could penetrate the alveoli of the lungs. In accordance with TRGS 521, particles with lengths of more than 5 µm, diameters of less than 3 µm and length to diameter ratios of more than 3:1 constitute fiber dust. Basalt fiber is so thick that it cannot get into the lungs and it also does not fibrillate, i.e. it does not split lengthways, which would make it thinner. The half-life, i.e. the time needed for a material in the human body to break down, is significantly less than 40 days in the case of basalt fiber, which means that it is not classified as a carcinogenic substance.

Due to the composition of the raw material for the melt proposed by the invention for producing continuous mineral fibers comprising 45% to 55% basalt rock and/or diabase, 19% to 34% quartz sand and 7% to 13% slag, in particular blast furnace slag, a high fiber yield is obtained and a good fiber quality. This enables constant reel sizes to be produced without ruptures in the filament.

The continuous basalt fiber produced from the raw materials proposed by the invention is primarily characterized by a high resistance to temperature, a high tearing resistance, high resistance to chemicals and alkalis, very good insulating and elastic properties, whilst lending itself to recycling.

In addition to a higher specific surface, finer fibers offer higher specific strength. Due to the property profile and above all in this respect the higher E-modulus, higher chemical resistance and greater stability at temperature, these continuous basalt fibers offer significant advantages over E-glass fibers. Basalt fiber is in a position to compete with glass fiber. The latter could be replaced by basalt fiber above all in those fields where the combination of higher E-modulus, broader temperature range and improved chemical stability, especially in the alkaline range, are of importance. Basalt fiber is establishing itself in niche markets where glass fiber can be used to only a limited degree and where the use of very expensive carbon fiber is not economically viable. Continuous basalt fiber can be used as a glass fiber substitute, e.g. as a heat-insulting and sound-insulating filler, etc. Since continuous basalt fiber is also very resistant to heat, it may also be used as a replacement for asbestos fiber. There is also concrete with continuous basalt fibers, which may be used instead of steel-reinforced concrete.

As with glass, basalt fiber can be recycled without any problem. Glass has already reached a recycling rate of over 80%. From a technical point of view, a higher recycling rate can be achieved for basalt fiber because it is obtained from natural raw materials.

Another advantage compared with conventional fibers is that continuous basalt fiber can be recycled because it is obtained from natural raw materials.

It has proved to be of advantage if 2% to 20%, in particular 5% to 12%, of clay, in particular clay minerals and admixtures, are used because clays and their by-products are converted into harder and more solid minerals on heating. Clay also serves as a source of silicon and aluminum.

Boron compounds, in particular boric acid and/or derivatives thereof, in particular salts, are used in a quantity selected from a range with a lower limit of 1%, in particular 3%, and an upper limit of 10%, preferably 5%, and boron compounds are used as flux. They also improve the resistance of the mineral fibers to corrosion. Boron compounds, in particular boric acid and derivatives thereof, may be used to reduce the coefficient of heat expansion and hence resistance of the continuous basalt fiber to changes in temperature, e.g. in the case of armoring fiber.

Iron compounds are used in a quantity selected from a range with a lower limit of 0.1%, in particular 0.5%, and an upper limit of 10%, preferably 1%, iron compounds being used as network modifiers which therefore modify the structure and properties of the fiber. Network modifiers are integrated into the structure formed by the network former. For standard commercial glass—lime-alkali glass—this would be sodium or potassium oxide and calcium oxide. These network modifiers tear the network structure open. As a result, bonds of the bridging oxygen to the silicon oxide tetrahedrons are broken open. Instead of the atom bond with the silicon, the oxygen forms an ion bond with an alkali atom.

Calcium oxide is used for the melt in a quantity selected from a range with a lower limit of 1%, in particular 2%, and an upper limit of 10%, preferably 4%, in which case the calcium oxide may serve as a network modifier. Added in the quantity proposed by the invention, CaO increases the hardness and chemical resistance, in particular resistance to alkalis, of the mineral fiber produced from the melt, in particular continuous basalt fiber. Ca compositions are deposited on the basalt fiber surface.

Fluoride carriers such as fluorspar are used in a quantity selected from a range with a lower limit of 1%, in particular 2%, and an upper limit of 10%, preferably 3%, fluorspar being added as flux. This additive facilitates the melting process and handling of the molten substances. It also reduces the melting temperature and viscosity of the melt.

Minerals and raw materials selected from a group comprising metal compounds, such as manganese, titanium, copper and aluminum compounds, cobalt compounds, alkali compounds, sodium compounds, potassium compounds alkali earth compounds, such as magnesium and barium compounds, kaolin, soda, may be added to the raw material charge, thereby enabling continuous basalt fibers to be tailored to suit the desired properties.

In another embodiment of the invention, raw material at least partially in the form of ground material and/or molded bodies comprising particles, in particular grounds, of basalt and/or diabase, at least one quartz component, in particular quartz sand, and slag, in particular blast furnace slag, may be used to form the melt, in which case the melting process can be made easier because more homogeneous conditions are created in the melting furnace, which improves the mineral fiber quality and increases the mineral fiber yield.

It has proved to be of particular advantage to use bodies with a size based on an upper limit of 100 mm because this enables the amount of energy needed for melting the bodies in the melting furnace to be kept low without adversely affecting the melt properties at the same time.

When using the method proposed by the invention for producing continuous mineral fibers from a melt of raw materials comprising 30% to 70% basalt and/or diabase, 10% to 40% quartz sand and 5% to 30% slag, in particular blast furnace slag, it has proved to be of advantage if all the handling and processing operations with basalt products conform to the Kyoto-2012 regulations. During heating, no toxic gases, foams or vapors or any other products or waste that are harmful to humans or the environment are given off.

It has also proved to be of advantage if the raw material at least partially in the form of molded bodies comprising particles of basalt and/or diabase and at least quartz sand and slag is used to form the melt. When producing fiber by the proposed method, the creation of fiber dust can be ruled out, which means that during production, processing, use and disposal of this fiber there is no risk to the health of persons involved. For specific applications, basalt fiber produced by the method proposed by the invention may also be used as a substitute for asbestos fiber.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The figures given as percentages in connection with the invention are based on percentage by weight unless otherwise stated.

By basalt in the context of the invention is meant a basic igneous rock. It consists above all of a mixture of iron and magnesium silicates with olivine and pyroxene as well as calcium-rich feldspar (plagioclase). Predominant mineral groups are plagioclase, pyroxene, predominantly in the form of augite or diopside. Olivine, biotite, amphibolite, as well as hornblende, alkali feldspar, quartz, hornfels and feldspathoids occur in some basalt deposits. Also, diabase, melaphyr, foidite, latite, phonolith, melilitholith, picrite, tephrite, andesite, porphyrite, spilite, trachyte, etc. are also understood as meaning basalt within the context of the invention. All in all, basalts have been found to be extremely variable rocks in terms of their chemical composition, contradicting their very standard appearance.

This invention describes raw material used to produce the melt for further processing to obtain mineral fibers, in particular continuous basalt fibers. In connection with the invention, these are termed MMMF (man-made mineral fibers)—in other words synthetically produced mineral fibers.

Mineral fibers may therefore be produced inexpensively. They may be made from a plurality of rocks, including igneous rock and basalt, slag generated during the manufacture of steel and other metals in blast furnaces, and from waste products from the phosphate industry.

Amongst other rock, the basalt used might be from the basalt deposits of Radlpaβ, Klöch, Oberhaag, Kim, Solosnica, Losonec, Kamenec, Zelesice, Zbraslav, Belice, Okucani, Rakovac, Ceramide, etc.

The main element of the melt is preferably basalt. The composition of the melt influences the chemical and physical properties of the basalt fiber, in particular due to the iron content.

Using quartz components, in particular quartz sand, in combination with slag, in particular blast furnace slag, to produce the melt enables the requisite content of $SiO_2$ to be incorporated in the melt. In addition, it is also possible to influence the melting behavior of the melt positively, which then enables an amorphous solidification of the melt. The quartz sand used for the purpose of the invention expediently consists of over 95% $SiO_2$.

Other substances can be added to improve the yield and quality of the continuous mineral fiber.

Clay, in particular clay minerals as well as admixtures and by-products, will result in higher strength of the continuous mineral fiber produced by the raw materials proposed by the invention. Clay acts as a source of SiO2 and Al2O3 and optionally Fe2O3. For example, typical clays used for the purpose of the invention contain between 50 and 90% $SiO_2$, 10 to 30% $Al_2O_3$ and up to 20% $Fe_2O_3$ in addition to small quantities of CaO, MgO, $K_2O$, $TiO_2$.

Flux, such as fluoride compounds, in particular fluorspar and/or boron compounds, such as boric acid, influence the viscosity of the melt, thereby enabling the production parameters to be optimized for the subsequent drawing and spinning processes.

Calcium oxide and iron compounds are used as network modifiers. Due to the iron content, the polyvalent properties of the iron may also be selectively used, for example the optical properties, in particular the infrared absorption, mechanical properties such as tensile strength, binding properties to plastics, etc. Iron compounds are also added as a means of improving the flow properties of the melt and for imparting color.

Feldspar is also used as a source of $SiO_2$ and $Al_2O_3$. Typical feldspars used for the purpose of the invention have a $SiO_2$ content of more than 60% and an $Al_2O_3$ content of more than 15% auf. Kaolin is likewise used as a source of $SiO_2$ and $Al_2O_3$.

Using the raw materials in the form of molded bodies enables a uniform melt to be obtained with a viscosity, from which the continuous mineral fibers to be drawn or spun.

The slag used is ground blast furnace slag in which the main elements are $SiO_2$, CaO, $Al_2O_3$, and MgO. A composition representing an example of a blast furnace slag which might be used for the purpose of the invention is based on: 37% $SiO_2$, 36.3% CaO, 8.4% MgO, 10.6% $Al_2O_3$, 0.4% $Fe_2O_3$, 4.1% $Na_2O$, 0.1% $P_2O_5$, 1.4% $K_2O$, 0.5% $TiO_2$, 1.3% MnO.

In another embodiment, synthetic minerals and raw materials selected from a group comprising iron compounds, manganese compounds, titanium compounds, boron compounds, etc., may also be added with a view to optimizing production parameters or influencing the properties of the continuous basalt fiber accordingly.

The exact chemical composition of the basalt fiber will depend on the composition of the melt and hence the raw materials used to form the melt. Basalt fiber known from the prior art and produced by the basaltex company is based on the following composition in percentage by weight: 52% $SiO_2$, 17% $AL_2O_3$, 9% CaO, 5%, MgO and 17% of other elements.

Using the raw materials specified by the invention to form the melt enables continuous mineral fibers with the following compositions as a % by weight to be produced:

|  | Group | | | | |
| --- | --- | --- | --- | --- | --- |
|  | 1 | 2 | 3 | 4 | 5 |
| $SiO_2$ | 42-51 | 51-65 | 45-55 | 48-52 | 55-65 |
| CaO | 4-18 | 6-15 | 10-20 | 18-23 | 10-15 |
| MgO | 3-10 | 2-8 | 2-10 | 10-16 | 1-4 |
| $Al_2O_3$ | 10-15 | 8-15 | 15-25 | 8-12 | 8-18 |
| $Fe_2O_3$ | 10-18 | 8-15 | 5-15 | 4-7 | 2-6 |
| $Na_2O$ | 1-6 | 1-6 | 1-6 | 1-3 | 0.3-5 |
| $P_2O_5$ | 0-1 | 0-0.5 | 0-1 | — | 0.1-0.9 |
| $K_2O$ | 0-5 | 0-5 | 0-5 | — | 1-5 |
| $TiO_2$ | 1-3 | 0-2 | 0-2 | 2-4 | 0.3-3 |
| MnO | 0-0.5 | 0-0.5 | 0-0.5 | — | 0.1-0.9 |
| S | not defined | not defined | not defined | not defined | not defined |

Mineral fibers from group 1 may be produced using basalt from Klöch, for example. Mineral fibers from group 2 have a higher proportion of $SiO_2$. Basalt fibers from group 3 have a higher proportion of $Al_2O_3$ The raw material used for the mineral fibers from group 4 is diabase and for fibers of group 5 andesite.

In particular, continuous mineral fibers, in particular continuous basalt fibers having the following composition, based on X-ray diffraction analysis, can be produced from the raw materials proposed by the invention (slight variations from 100% may occur in the total due to measuring inaccuracies, glow losses, etc.):

| Group | 6 | 7 | 8 | 9 | 10 | 11 |
|---|---|---|---|---|---|---|
| SiO$_2$ | 61.3 | 55.6 | 60.8 | 60.2 | 64.4 | 49.9 |
| CaO | 12.4 | 14.1 | 13.1 | 12 | 11.6 | 7.4 |
| MgO | 3.2 | 4.5 | 3.1 | 3.3 | 4.5 | 4.8 |
| Al$_2$O$_3$ | 12.1 | 15.3 | 14 | 13.6 | 8.6 | 10.3 |
| Fe$_2$O$_3$ | 5.7 | 7.1 | 5.9 | 5.6 | 6.0 | 6.6 |
| Na$_2$O | 1.7 | 0.3 | 0.3 | 1.7 | 2.2 | 0.5 |
| P$_2$O$_5$ | 0.3 | 0.2 | 0.2 | 0.3 | 0.3 | 0.3 |
| K$_2$O | 1.2 | 1.6 | 1.5 | 1.3 | 1.0 | 1.0 |
| TiO$_2$ | 0.8 | 0.9 | 0.9 | 0.8 | 1.1 | 1.4 |
| MnO | 0.2 | 0.4 | 0.2 | 0.2 | 0.3 | 0.2 |
| Cr (ppm) | — | 467.2 | 132.1 | 173.9 | 316.9 | 382 |

| Group | 12 | 13 | 14 | 15 | 16 | 17 |
|---|---|---|---|---|---|---|
| SiO$_2$ | 61.1 | 63.5 | 56.6 | 75.3 | 64.5 | 42.2 |
| CaO | 11.4 | 13.9 | 9.2 | 4.9 | 7.7 | 4.7 |
| MgO | 2.3 | 1 | 3.8 | 6.2 | 0.2 | 8.2 |
| Al$_2$O$_3$ | 15 | 12.7 | 16.5 | 26.2 | 12.2 | 9 |
| Fe$_2$O$_3$ | 3.1 | 3 | 6.1 | 3.1 | 5 | 5 |
| Na$_2$O | 3.3 | 2.7 | 2 | 1.4 | 8.8 | 0.9 |
| P$_2$O$_5$ | 0.2 | 0.2 | 0.2 | 0 | 0.2 | 0.1 |
| K$_2$O | 2.4 | 2.1 | 1.2 | 1.2 | 1.2 | 2.4 |
| TiO$_2$ | 0.8 | 0.7 | 0.7 | 0.3 | 0.2 | 0.3 |
| MnO | 0.4 | 0.2 | 0.2 | 0.2 | — | 0.1 |
| Cr (ppm) | — | — | — | 89.4 | 69 | 348.2 |

| Group | 18 | 19 | 20 | 21 |
|---|---|---|---|---|
| SiO$_2$ | 52 | 60.5 | 64.2 | 60.5 |
| CaO | 9.6 | 12.3 | 7.8 | 12.2 |
| MgO | 6 | 2.3 | 4.4 | 2.3 |
| Al$_2$O$_3$ | 13.5 | 13.4 | 18 | 13.3 |
| Fe$_2$O$_3$ | 4.6 | 5.1 | 7.1 | 5.3 |
| Na$_2$O | 2.4 | 1.6 | 1.9 | 1.6 |
| P$_2$O$_5$ | 0.1 | 0.2 | 0.1 | 0.3 |
| K$_2$O | 1.6 | 1.5 | 1.6 | 1.5 |
| TiO$_2$ | 0.4 | 1 | 0.4 | 1 |
| MnO | 0.3 | 0.2 | 1.9 | 0.2 |
| Cr (ppm) | 119.6 | — | 374.1 | — |

Before reaching the melting furnace, the raw material is preferably prepared in the form of molded bodies, in particular with a size having a lower limit of 1 mm and an upper limit of 100 mm. The molded bodies used are of the type described in the applicant's patent application "Pre-treatment of raw material for producing basalt fibers" dated 23, Dec. 2010.

In an alternative embodiment, the raw material may also be introduced into the melting furnace in the form of ground material.

The raw material, in the form of ground material or molded bodies, is placed in a melting tank where the raw material is melted by means of electrodes. Alternatively, the raw material may also be fired using coal or gas, causing it to melt.

In terms of the production method, any method of producing continuous mineral fibers known from the prior art may be used. For example, the raw materials are melted in a melting furnace, the melt is drawn to obtain continuous fibers, the fibers are coated, dried, reeled and then subjected to further processing depending on the intended application.

A few examples of the composition of the raw material charge proposed by the invention will be explained below, although these are not intended to be restrictive.

| | A | B | C | D | E |
|---|---|---|---|---|---|
| Basalt | 70 | 55 | 54 | — | — |
| Diabase | — | — | — | 40 | 60 |
| Quartz sand | 10 | 19 | 19 | 34 | 30 |
| Clay mineral | 7 | 12 | 12 | 5 | — |
| Blast furnace slag | 13 | 10 | 10 | 13 | 7 |
| Boric acid | — | — | — | 5 | 3 |
| Fe$_2$O$_3$ | — | — | 1 | — | — |
| CaO | — | 4 | 4 | — | — |
| Fluorspar | — | — | — | 3 | — |
| Total | — | — | — | — | — |

In raw material charge examples A, B and C, the main element is basalt and in the embodiments set out as examples D and E, the main element is diabase.

From the raw material charge A, mineral fibers in group 7 based on the XRF analysis can be produced, for example. From composition B, mineral fibers in group 8 can be produced, from composition C mineral fibers in group 9, from composition D mineral fibers in group 10, and from composition E mineral fibers in group 11.

Details of other possible compositions of the raw material charge are set out below.

| | F | G | H | I | J |
|---|---|---|---|---|---|
| Basalt | — | — | 65 | 35 | 37 |
| Andesite | 60 | 60 | — | — | — |
| Quartz | 8 | 18 | 12 | 30 | 38 |
| Clay | 8 | 5 | 11 | 3 | — |
| Blast furnace slag | 24 | 9 | — | 5 | 5 |
| Boric acid | — | — | — | 3 | — |
| Fe$_2$O$_3$ | — | — | — | — | 4 |
| CaO | — | 8 | — | — | 8 |
| Kaolin | — | — | 12 | — | — |
| Sodium carbonate | — | — | — | 7 | 8 |
| Al$_2$O$_3$ | — | — | — | 15 | — |
| MgO | — | — | — | 2 | — |
| Total | 100 | 100 | 100 | 100 | 100 |

| | K | L | M | N | O | P |
|---|---|---|---|---|---|---|
| Basalt | 50 | 60 | 54 | 60 | 53 | 56 |
| Quartz | 25 | 13 | 18 | 16 | 18 | 19 |
| Clay | 3 | 3 | 12 | — | 12 | 11 |
| Blast furnace slag | 5 | 20 | 10 | 13 | 10 | 8 |
| Boric acid | 2 | 2 | — | 2 | — | — |
| Fe$_2$O$_3$ | — | 2 | 1 | 2 | 2 | 1 |
| CaO | — | — | 5 | — | 5 | — |
| Kaolin | — | — | — | — | — | — |
| Al$_2$O$_3$ | 10 | — | — | 5 | — | 5 |
| MgO | 5 | — | — | — | — | — |
| MnO | — | — | — | 2 | — | — |
| Total | 100 | 100 | 100 | 100 | 100 | 100 |

The raw material charges F, G, H, I, J, K, L, M, N, O and P respectively enable mineral fibers based on XRF analysis of group 12, 13, 14, 15, 16, 17, 18, 19, 20, 21 and 6 to be produced, for example.

During tests, the following physical parameters of mineral fibers in the form of monofilaments produced from the compositions of the raw materials listed above were defined: titer (dtex), tenacity (cN/tex), extension (%), output (g/h).

The values for the titer lie between 1.2 and 9.6 dtex, those for tenacity lie below 200 cN/tex, in particular between 1 and 100 cN/tex, preferably between 6 and 60 cN/tex, those for extension lie below 5%, in particular between 1 and 4%, preferably between 1.7 and 2.4% and those for output above g/h, in particular between 30 and 1250 g/h, preferably between 10 kg/h and 40 kg/h.

| Group | Titer (dtex) | Tenacity (cN/tex) | Extension (%) | Output (g/h) |
|---|---|---|---|---|
| 6 | 1.9 | 48 | 3.3 | 109 |
| 7 | 11.8 | 198.6 | 0.1 | 3452 |
| 8 | 12.3 | 170.6 | 2.0 | 4561 |
| 9 | 17.0 | 123.4 | 0.6 | 6578 |
| 10 | 3.6 | 198.1 | 1.5 | 1876 |
| 11 | 1.1 | 107.7 | 1.7 | 23345 |
| 12 | 3.7 | 51.2 | 2 | 34.2 |
| 13 | 1.2 | 45.9 | 2 | Not defined |
| 14 | 9.6 | 5.9 | 2.3 | Not defined |
| 15 | 2.8 | 12.5 | 1.6 | 22768 |
| 16 | 3.4 | 49.1 | 1.9 | 102.5 |
| 17 | 3.4 | 55 | 2.4 | 56.3 |
| 18 | 3.6 | 44.1 | 1.7 | 124.3 |
| 19 | 2.9 | 49.5 | 1.9 | 32.6 |
| 20 | 2 | 50.7 | 2.1 | 67.6 |
| 21 | 3 | 60.8 | 2.4 | 123.8 |
| 22 | 1.8 | 36.2 | 1 | 19765 |
| 23 | 0.9 | 65.9 | 2.1 | 27453 |

It was also found that the raw material charges proposed by the invention produced a melt which could be readily spun, i.e. at a speed of ca. 3600 m/min and to a length of 50,000 m without exhibiting ruptures. The mineral fiber produced from the raw materials proposed by the invention also exhibited a high tensile strength of over 4500 MPa for a mean diameter of ca. 5 µm to 40 µm, in particular 7 µm to 20 µm.

Test results showed that the alkali resistance of mineral fibers made from the raw materials listed above was significantly better than that of glass fiber.

This invention further relates to a method of producing continuous mineral fibers, in particular basalt fibers, from a melt, whereby the melt is formed from raw material comprising 30% to 70% basalt, 8% to 40% quartz components and 5% to 30% slag, in particular blast furnace slag.

Other materials which may be added for the purpose of the method may be found in the explanations given above in connection with the raw material charge for the melt for producing continuous mineral fibers, in particular basalt fibers.

Using the raw material charge proposed by the invention, it is possible to produce basalt fibers with the structure described in the applicant's patent application "Basalt fibers" dated 23, Dec. 2010, which is also incorporated in this application by way of reference.

The embodiments described as examples represent possible variants of the raw material charge, and it should be pointed out at this stage that the invention is not specifically limited to the variants specifically described, and instead the individual variants may be used in different combinations with one another and these possible variations lie within the reach of the person skilled in this technical field given the disclosed technical teaching. Accordingly, all conceivable variants which can be obtained by combining individual details of the variants described are possible and fall within the scope of the invention.

The objective underlying the independent inventive solutions may be found in the description.

Above all, the individual embodiments described on the basis of examples constitute independent solutions proposed by the invention in their own right. The objectives and associated solutions proposed by the invention may be found in the detailed descriptions.

The invention claimed is:

1. A raw material charge for a melt for producing continuous mineral fibers, wherein the raw material charge contains 30 wt. % to 70 wt. % basalt and/or diabase, 19 wt. % to 34 wt. % quartz sand, and 7 wt. % to 13 wt. % blast furnace slag.

2. The raw material charge according to claim 1, wherein the raw material charge contains 45 wt. % to 55 wt. % basalt and/or diabase.

3. The raw material charge according to claim 1, wherein the raw material charge contains 5 wt. % to 12 wt. %.

4. The raw material charge according to claim 1, wherein the raw material charge contains boric acid and/or boric salts selected from a range with a lower limit of 3 wt. % and an upper limit of 10 wt. %.

5. The raw material charge according to claim 1, wherein the raw material charge contains iron compounds selected from a range with a lower limit of 0.5 wt. % and an upper limit of 10 wt. %.

6. The raw material charge according to claim 1, wherein the raw material charge contains calcium oxide selected from a range with a lower limit of 2 wt. % and an upper limit of 10 wt. %.

7. The raw material charge according to claim 1, wherein the raw material charge contains fluorspar selected from a range with a lower limit of 2 wt. % and an upper limit of 10 wt. %.

8. The raw material charge according to claim 1, wherein the raw material charge contains further minerals and raw materials selected from a group consisting of metal compounds, alkali compounds, and alkaline earth.

9. The raw material charge according to claim 1, wherein the raw material charge is present at least partially in the form of ground material of basalt and/or diabase, quartz sand, and blast furnace slag and/or in the form of molded bodies formed from particles of basalt and/or diabase, quartz sand, and blast furnace slag.

10. The raw material charge according to claim 9, the raw material charge is present at least partially in the form of molded bodies formed from particles of basalt and/or diabase, quartz sand, and blast furnace slag, and wherein the molded bodies have a length with an upper limit of 100 mm.

11. A method of producing continuous mineral fibers from a melt, the method comprising steps of: melting a raw material charge to form the melt, the raw material charge comprising 30 wt. % to 70 wt. % basalt and/or diabase, 19 wt. % to 34 wt. % quartz sand, and 7 wt. % to 13 wt. % blast furnace slag, and forming the continuous mineral fibers from the melt.

12. The method according to claim 11, wherein at least one other substance is added to the melt.

13. The method according to claim 11, wherein the raw material charge is made up at least partially of molded bodies formed from particles of basalt and/or diabase, quartz sand, and blast furnace slag.

14. A method of producing protection or armoring, the method comprising steps of:
   melting a raw material charge containing 30 wt. % to 70 wt. % basalt and/or diabase, 19 wt. % to 34 wt. % quartz sand, and 7 wt. % to 13 wt. % blast furnace slag to form a melt;
   drawing or spinning the melt to produce a mineral fiber; and
   forming the mineral fiber as a non-metallic protection or non-metallic armoring.

* * * * *

UNITED STATES PATENT AND TRADEMARK OFFICE
CERTIFICATE OF CORRECTION

PATENT NO. : 9,073,780 B2  Page 1 of 1
APPLICATION NO. : 13/996115
DATED : July 7, 2015
INVENTOR(S) : Schinkinger et al.

It is certified that error appears in the above-identified patent and that said Letters Patent is hereby corrected as shown below:

In the claims,

In Column 10, line 10 (Line 2 of Claim 3) after "12 wt. %", please insert:
--clay minerals and clay admixtures--.

In Column 10, line 30 (Line 4 of Claim 8) after the word "earth", please insert: --compounds--.

Signed and Sealed this
Tenth Day of November, 2015

Michelle K. Lee
*Director of the United States Patent and Trademark Office*